(12) United States Patent
Liu

(10) Patent No.: US 9,128,964 B2
(45) Date of Patent: Sep. 8, 2015

(54) SELECTIVE MAPPING OF INTEGRATED DATA

(75) Inventor: Tse-Hsin Jason Liu, Wellesley, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2039 days.

(21) Appl. No.: 12/059,201

(22) Filed: Mar. 31, 2008

(65) Prior Publication Data

US 2009/0248714 A1 Oct. 1, 2009

(51) Int. Cl.
*G06F 7/00* (2006.01)
*G06F 17/00* (2006.01)
*G06F 17/30* (2006.01)

(52) U.S. Cl.
CPC .... *G06F 17/30292* (2013.01); *G06F 17/30557* (2013.01)

(58) Field of Classification Search
CPC .................................................. G06F 17/30079
See application file for complete search history.

(56) References Cited

U.S. PATENT DOCUMENTS

| | | | | |
|---|---|---|---|---|
| 7,349,980 | B1 * | 3/2008 | Darugar et al. | 709/238 |
| 2003/0068046 | A1 * | 4/2003 | Lindqvist et al. | 380/277 |
| 2005/0260973 | A1 * | 11/2005 | van de Groenendaal | 455/411 |
| 2006/0224448 | A1 * | 10/2006 | Herf | 705/14 |
| 2007/0067297 | A1 * | 3/2007 | Kublickis | 707/9 |
| 2008/0255944 | A1 * | 10/2008 | Shah et al. | 705/14 |

* cited by examiner

*Primary Examiner* — Susan Chen

(57) ABSTRACT

In one of many possible implementations, an exemplary system includes a plurality of data subsystems configured to store local data associated with an external party, the data subsystems configured to be maintained by an internal party. The system further includes a data integration subsystem configured to store global data and a defined mapping of the global data to the local data, the global data including a global data record mapped to a local data record having a first data schema type, recognize a migration event in the local data, the migration event including migration of the first schema type local data record to a second schema type local data record, and associate a smart mapping record with the global data record, the smart mapping record configured to selectively map the global data record to one of the first schema type local data record and the second schema type local data record.

22 Claims, 9 Drawing Sheets

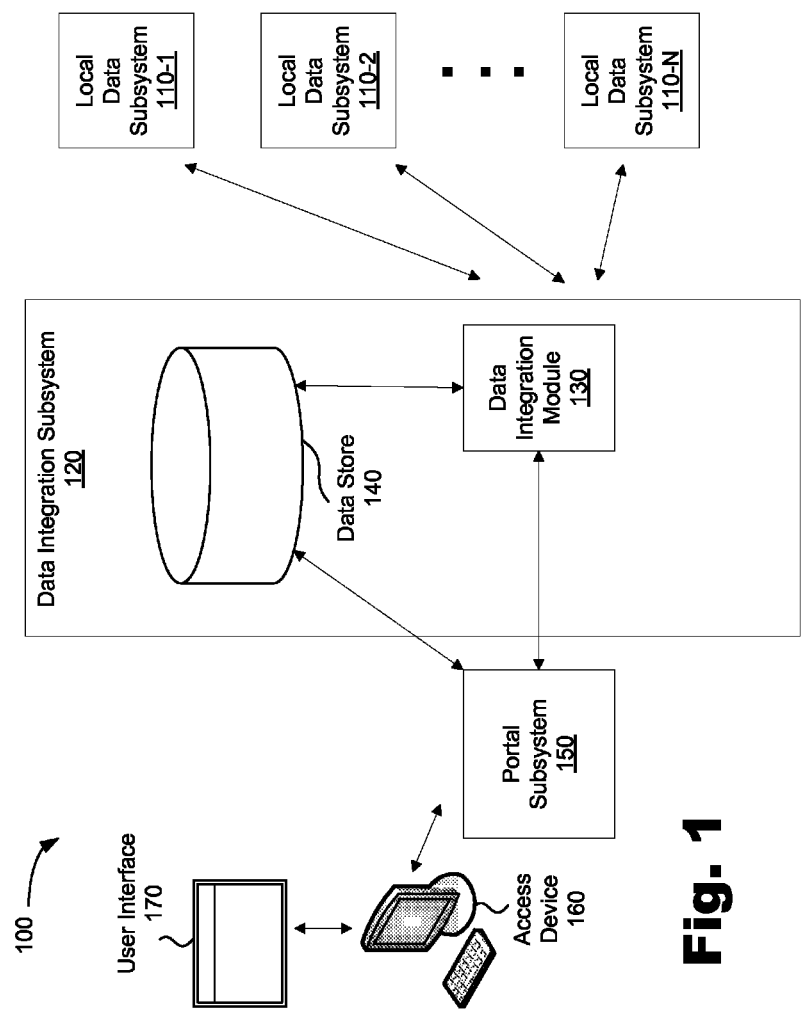

SELECTIVE MAPPING OF INTEGRATED DATA

BACKGROUND INFORMATION

A typical enterprise computing environment includes multiple heterogeneous and distributed database systems supporting a variety of different enterprise organizations and business purposes. For example, many enterprises, such as businesses and the like, maintain different backend database systems to support customer billing, sales, accounting, marketing, inventory, ordering, repairs, procurement, etc. Further, many enterprises are the result of a merger of two or more predecessor organizations, each with their own set of heterogeneous and distributed database systems.

There are many reasons why multiple heterogeneous and distributed database systems may exist within an enterprise. Where database systems were created using different technologies or different data models, there may be considerable disruption to the enterprise, not to mention considerable time and expense, in migrating multiple database systems to a common technology platform. Moreover, migration of data may disrupt an enterprise's ability to provide meaningful and consistent information to customers while also maintaining the integrity of the data. For instance, a customer may be granted access to certain account data, but when the account data is migrated from one technology platform to another at the backend, the customer may no longer be able to access the account data as it existed before the migration. Such an occurrence may be inconvenient or even unacceptable to the customer. This and other concerns associated with data migration may delay or prevent an enterprise from migrating data. Thus, although migration of data may be desirable to an enterprise, certain concerns, including difficulties in maintaining data integrity and consistency of data presentation, for example, may prevent an enterprise from migrating data.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical reference numbers designate identical or similar elements.

FIG. 1 illustrates an exemplary data management system.

DETAILED DESCRIPTION OF PREFERRED EMBODIMENTS

Figure 3:
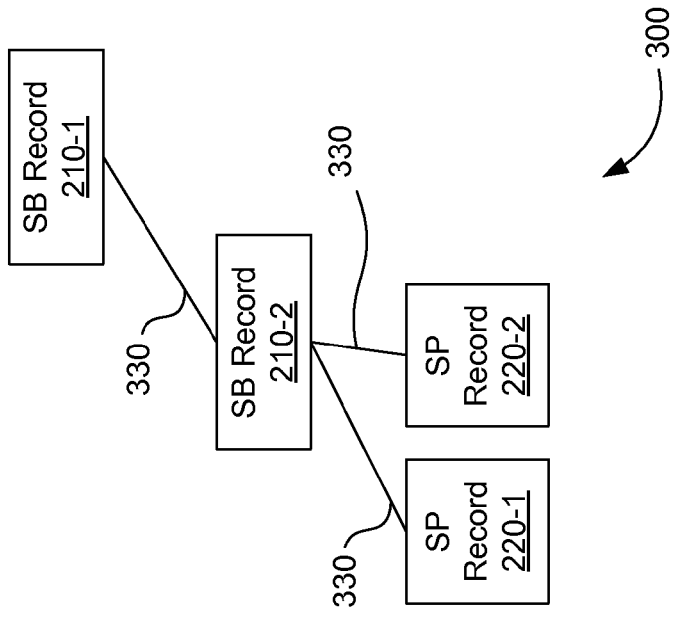
FIG. 3 illustrates an exemplary customizable data structure associated with the baseline data structure of FIG. 2.

Exemplary data migration mapping for data management systems and methods is disclosed. Exemplary systems and methods may be configured to detect migrations of local data and generate and maintain one or more smart mappings configured to selectively map global data records to pre-migration local data or post-migration local data. One or more conditions may be defined, associated with the smart mappings, and used to selectively map global data records to pre-migration local data or post-migration local data. In certain implementations, the smart mappings may be used to support providing of consistent views of global data before and after a data migration. Additionally or alternatively, the smart mappings may be used to transparently route data access requests to pre-migration local data or post-migration local data based on functions (e.g., business purposes and/or operations such as billing, orders, repairs, sales, etc.). Accordingly, post-migration data may be transparently selected and provided for a first function (e.g., billing), and pre-migration data may be transparently selected and provided for one or more other functions (e.g., orders and repairs).

An exemplary method may include maintaining global data and a defined mapping of the global data to local data maintained by a plurality of local data subsystems, the global data including a global data record mapped to a local data record having a first data schema type, recognizing a migration event in the local data, the migration event including migration of the first schema type local data record to a second schema type local data record, and associating a smart mapping record with the global data record, the smart mapping record configured to selectively map the global data record to one of the first schema type local data record and the second schema type local data record.

In certain implementations, the method may further include maintaining a data structure representative of a set of data relationships in the global data, the data structure including the global data record, and providing a consistent view of at least a portion of the data structure for display to an external party before and after the migration event.

In certain implementations, the method may further include detecting a data access request associated with the global data record, determining a parameter associated with the data access request, and selectively mapping the global data record to one of the first schema type local data record and the second schema type local data record based on the parameter.

In certain implementations, the method may further include providing, in response to the data access request, data included in the first schema type local data record for display when the parameter comprises a first function, and providing, in response to the data access request, data included in the second schema type local data record for display when the parameter comprises a second function.

An exemplary system may include a plurality of data subsystems configured to store local data associated with an external party, the data subsystems configured to be maintained by an internal party. The system may further include a data integration subsystem configured to store global data and a defined mapping of the global data to the local data, the global data including a global data record mapped to a local data record having a first data schema type. The data integration subsystem may be configured to recognize a migration event in the local data, the migration event including migration of the first schema type local data record to a second schema type local data record, and to associate a smart mapping record with the global data record, the smart mapping record configured to selectively map the global data record to one of the first schema type local data record and the second schema type local data record.

The system may further include a portal subsystem configured to provide a user utilizing an access device with external access to the global data, including a view of a data structure including the global data record. When the user selects the global data record, data integration subsystem may selectively map the global data record to one of the first schema type local data record and the second schema type local data record and retrieve data included in the selected local data record. The portal subsystem may be configured to provide the retrieved data to the access device for display to the user.

Components of exemplary data management systems and methods will now be described with reference to the drawings.

FIG. 1 illustrates an exemplary data management system 100 (or simply "system 100"). As shown in FIG. 1, system 100 may include local data subsystems 110-1 through 110-N (collectively "local data subsystems 110") communicatively coupled to a data integration subsystem 120 having a data integration module 130 and a data store 140. System 100 further includes a portal subsystem 150 communicatively coupled to data integration subsystem 120 and configured to selectively communicate with an access device 160 that is configured to present a user interface 170 to a user of the access device 160.

Elements of system 100 may communicate with one another using any suitable communication technologies, devices, media, and protocols supportive of data communications, including, but not limited to, the Internet, intranets, local area networks, other communications networks, data transmission media, communications devices, Transmission Control Protocol ("TCP"), Internet Protocol ("IP"), File Transfer Protocol ("FTP"), Telnet, Hypertext Transfer Protocol ("HTTP"), socket connections, Ethernet, data bus technologies, and other suitable communications technologies. In certain implementations, at least a subset of communications between local data subsystems 110 and data integration subsystem 120 may be carried out as described in co-pending U.S. patent application Ser. No. 11/443,364, entitled "Asynchronous Data Integrity For Enterprise Computing," filed May 31, 2006 and incorporated herein by reference in its entirety.

In certain implementations, one or more elements of system 100 may be implemented in one or more computing devices. System 100 may include any computer hardware and/or instructions (e.g., software programs), or combinations of software and hardware, configured to perform the processes described herein. In particular, it should be understood that elements of system 100 may be implemented on one or more physical computing devices. Accordingly, system 100 may include any one of a number of computing devices (e.g., one or more servers), and may employ any of a number of computer operating systems, including, but by no means limited to, known versions and/or varieties of the Microsoft Windows, Unix, and OS/390 operating systems. System 100 may also employ any of a number of database management tools, including, but not limited to, known versions and/or varieties of Microsoft SQL Server and DB2.

Accordingly, one or more of the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) may include any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media may include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary system 100 is shown in FIG. 1, the exemplary components illustrated in the Figure are not intended to be limiting. Other alternative hardware environments and implementations may be used in other implementations. Exemplary components of system 100 will now be described in additional detail.

Each of the local data subsystems 110 may include one or more computing devices and/or data management applications configured to store and maintain electronic data that may be referred to as "local data." Each of the local data subsystems 110 may include one or more databases and/or other suitable data storage technologies, including known data storage technologies.

Local data may represent one or more data records and relationships between data records, which may be referred to as local data records and relationships. In certain examples, local data subsystems 110 may be operated by an internal party, and the local data maintained by the internal party may be associated with one or more external parties such as customers of the internal party. As used herein, "internal party" may refer to any person or organization (e.g., a service provider) maintaining data, and "external party" or "external user" may refer to any person or organization that is external to (i.e., not part of) the internal party. Hence, local data may include, but is not limited to, data records representative of customer entities and customer accounts, as well as data representing one or more relationships between the customer entities and accounts.

As an example, an external party may include a customer of the internal party, such as a subscriber to services provided by the internal party. The internal party (e.g., a telecommunications enterprise) may maintain data associated with the external party and/or related to the providing of one or more services (e.g., telecommunications services) to the external party. The internal party may maintain local customer-related data in local data subsystems 110. Each of the local data subsystems 110 may be associated with different organizations and/or business purposes of the enterprise, including customer billing, sales, accounting, marketing, inventory, ordering, repairs, procurement, or other organizations, purposes, or operations of the enterprise. Local data subsystems 110 may also be associated with and/or distributed across different geographic areas.

While certain exemplary implementations described herein refer to customer-related data, which may also be referred to herein as subscriber-related data, the examples are not limiting. Local data may represent other information in other implementations.

Typically, local data subsystems 110 are heterogeneous and/or maintain heterogeneous data. For example, one or more of the local data subsystems 110 may store local data according to local data schemas that are different from the local data schemas used by other local data subsystems 110. For instance, local data subsystem 110-1 may employ a first data schema, local data subsystem 110-2 may employ a second data schema, and local data subsystem 110-N may employ another data schema. As used herein, a "data schema" or "data schema type" may refer to a definition of one or more properties, technologies, templates, frameworks, formats, data models, and/or business rules that may be used to represent data. For example, a data schema may provide a framework for naming, storing, and accessing different elements of information.

Returning to FIG. 1, data integration subsystem 120 may include any device or combination of devices and communication technologies useful for communicating with portal subsystem 150 and local data subsystems 110. Data integration subsystem 120 may also include any device or combination of devices and data storage and processing technologies useful for storing and processing data, including "global data" that is mapped to local data stored at the local data subsystems 110.

Global data may be mapped from the local data and stored at data integration subsystem 120 in any manner suitable for maintaining data integrity between the global and local data, including preserving behaviors, relationships, and properties of the local data. A mapping between local data and global data may be defined based on local data models, properties of the local data, and/or as may serve a particular implementation. A mapping between local data and global data may also be based on a predefined global data model. Accordingly, a mapping can represent any definition of a set of one or more relationships between local data and global data that can suitably preserve the properties of the local data (or at least certain select properties of the local data) in the global data and that is in accordance with a global data model.

A mapping may be defined in any acceptable manner, including one or more persons (e.g., system administrators or operators) associated with the internal party manually defining a mapping based on the properties and specifications of local data stored in local data subsystems 110 and on a global data model. Alternatively or additionally, automatic mapping operations may be performed to define a mapping based on a predefined mapping heuristic. A defined mapping may be used in subsequent processing for automatically translating between and/or synchronizing the local data and the global data. As described further below, mappings may be used to map global data to local data to fulfill data access requests.

In certain implementations, global data may be mapped to local data in any of the ways described in co-pending U.S. patent application Ser. No. 11/443,363, entitled "Systems and Methods for Managing Integrated and Customizable Data," filed May 31, 2006, and incorporated herein by reference in its entirety. A mapping may be defined based on the exemplary global data model described in the same U.S. patent application Ser. No. 11/443,363.

Data integration subsystem 120 may be configured to maintain global data such that over time the global data accurately represents local data stored in local data subsystems 110. Updates to local data may be carried through to global data in accordance with one of more predefined mappings between the global and local data. The updates may synchronize global data with local data.

Data integration module 130 may be configured to automatically translate data between a global data model implemented in data integration subsystem 120 and one or more of the local data models used by the local data subsystems 110. In particular, data integration module 130 may include one or more agents (e.g., software applications) that are configured to coordinate with local agents associated with the local data subsystems 110 to translate data between the global data model and the local data models. Translation functions may be performed in accordance with one or more of the above-described mappings between local and global data. In certain implementations, data translation operations, including, but not limited to, messaging, prioritization, update, synchronization, and integrity checking operations, may be carried out in any of the ways and using any of the technologies described in the previously mentioned an incorporated co-pending U.S. patent application Ser. No. 11/443,364 filed on May 31, 2006. Accordingly, global data stored at data integration subsystem 120 can be updated to reflect changes to the local data and thus accurately represent over time the local data stored at the local data subsystems 110.

Global data may be stored in data store 140, which may include one or more data storage mediums, devices, or configurations and may employ any type, form, and combination of storage media, including, but not limited to, hard disk drives, read-only memory, caches, databases, optical media, and random access memory. Data store 140 may include any suitable technologies useful for storing, updating, modifying, accessing, retrieving, deleting, copying, and otherwise managing data.

Global data may include global data records representing any suitable information, including information associated with one or more external parties, such as information about customer entities and accounts. Data records representative of customer entities and accounts may be referred to as "subscriber records" and "subscription records," respectively. Such data records may include any information related to customer entities and accounts, including customer and/or account identifiers. The data records may also include type identifiers indicative of various types of data records. For example, a type identifier may indicate whether a data record is a subscriber or subscription record.

Global data may also include map records representative of links between data records. Accordingly, map records may be used to define one or more data relationships between data records such as subscriber and subscription records. Map records may include map record identifiers, as well as identifiers for data records being linked by the map records. Map records may also include relationship type identifiers indicative of relationship types between data records. For example, map record type identifiers may indicate whether map records are associated with a fixed or customizable data relationship (i.e., unchangeable or changeable by an external party), or the types of data records that are linked by the map records (e.g., subscriber-to-subscriber, subscriber-to-subscription, or subscription-to-subscription map records). Global data, including global data and map records, may be assigned unique identifiers that enable the global data records to be used across system 100.

Global data and map records may be grouped to represent sets of data relationships. For example, data records may be linked by one or more map records to form a "data structure" representing a set of data relationships. Typically, such a data structure may define a hierarchical data tree having data records as nodes and map records linking the data records together to define a set of relationships between the data records. Any suitable data entity may be used to define a data structure, including one or more relational or hierarchical data tables, for example.

While global and local data may be used for the operations of an internal party operating the data integration subsystem 120 and local data subsystems 110, access to at least a subset of the global data may be selectively provided for external user access (i.e., for access by one or more users associated with an external party). External user access to local data may be gained by way of the global data. This may allow an external party to access, manage, and utilize global data, and consequently local data, maintained by the internal party.

Portal subsystem 150 may be configured to provide external access to global data stored at data store 140, as well as to local data by mapping global data to local data. Portal subsystem 150 may include or be implemented on one or more computing devices. Portal subsystem 150 and data integration subsystem 150 may be implemented on one computing device or on a plurality of computing devices. In certain implementations, portal subsystem 150 includes or is implemented on one or more servers (e.g., web servers) configured to selectively communicate with access device 160. Portal subsystem 150 and access device 160 may communicate over a communication network, which may include any network suitable for carrying communications between access device 160 and portal subsystem 150, including, but not limited to, the Internet or an intranet. In certain implementations, portal subsystem 150 provides an access portal by which external users can access and utilize global data stored in data store 140.

An external user may utilize access device 160 to communicate with portal subsystem 150 and access and manage global data. Access device 160 may include any device physically or remotely accessible to one or more users and that allows a user to provide input to and receive output from portal subsystem 150. For example, access device 160 may include, but is not limited to, one or more desktop computers, laptop computers, tablet computers, personal computers, personal data assistants, cellular telephones, satellite pagers, wireless internet devices, embedded computers, video phones, mainframe computers, mini-computers, programmable logic devices, vehicular computers, Internet-enabled devices, and any other devices capable of communicating with portal subsystem 150. Access device 160 can also include or interact with various peripherals such as a terminal, keyboard, mouse, screen, printer, stylus, input device, output device, or any other apparatus that can help a user interact with access device 160.

Access device 160 may provide external access to portal subsystem 150 and consequently to data integration subsystem 120 via the portal subsystem 150. Accordingly, one or more users associated with an external party may utilize access device 160 to provide requests to and receive output from portal subsystem 150.

Access device 160 may include instructions for generating and operating user interface 170. The instructions may be in any computer-readable format, including software, firmware, microcode, and the like. When executed by a processor (not shown) of access device 160, the instructions may present user interface 170 to a user of access device 160. User interface 170 may be configured to present representations of global data, local data, and one or more data management tools configured to enable a user to externally access and use the global and/or local data.

User interface 170 may comprise one or more graphical user interfaces ("GUIs") configured to display information and receive input from users. In certain exemplary implementations, user interface 170 includes a web browser, such as Internet Explorer, Mozilla Firefox, Safari, and the like. However, user interface 170 is not limited to web-based and/or graphical implementations and may include many different types of user interfaces that enable users to utilize access device 160 to communicate with portal subsystem 150. In some implementations, for example, user interface 170 may include a voice interface capable of receiving voice input from and/or providing voice output to a user.

A single access device 160 is shown in FIG. 1 for illustrative purposes only. It will be recognized that one or more access devices 160 may communicate with portal subsystem 150 and gain external access to global data.

External access to global data and/or local data may be based on permissions settings maintained by portal subsystem 150. Permissions settings may be stored in portal subsystem 150, data store 140, or at an external location. Portal subsystem 150 may access and use permission settings to determine whether users have permission to access certain global and/or local data, or to determine the specific global and/or local data accessible to users. This allows portal subsystem 150 to selectively provide users or groups of users with access to different sets of global and/or local data in accordance with the permissions settings. Permissions settings may be included in one or more user profiles maintained by portal subsystem 150 and/or data integration subsystem 120. The user profiles may correspond with users associated with an external party. Portal subsystem 150 may be configured to maintain user permissions settings in any of the ways described in co-pending U.S. patent application Ser. No. 11/584,098, entitled "Integrated Data Access" and filed Oct. 20, 2006, co-pending U.S. patent application Ser. No. 11/584, 111, entitled "Integrated Application Access" and filed Oct. 20, 2006, and/or the previously mentioned co-pending U.S. patent application Ser. No. 11/443,363 filed on May 31, 2006, each of which is herein incorporated by reference in its entirety.

Figure 2:
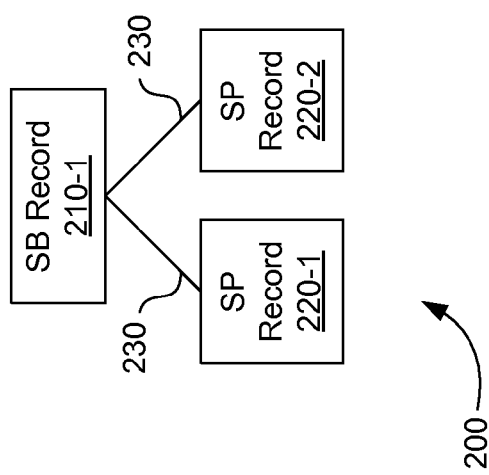
FIG. 2 illustrates an exemplary baseline data structure representing a base set of relationships between global data records.

A set of global data to which a user is allowed access based on permissions settings may be referred to as a "baseline data structure" or "entitlement data view." FIG. 2 illustrates an exemplary baseline data structure 200. Based on permissions settings, in some implementations a user (e.g., a user associated with an external party) may utilize access device 160 to communicate with portal subsystem 150 and access and view the baseline data structure 200. While the user may be allowed to view the baseline data structure 200, the structure 200 may be fixed, i.e., unchangeable by the external party. This enables system 100 to maintain data integrity between the global and local data.

As shown in FIG. 2, baseline data structure 200 may include a subscriber record 210-1 (SB record 210-1) having subscription records 220-1 and 220-2 (SP records 220-1 and 220-2) as child nodes. Subscriber record 210-1 may be assigned a unique identifier, which may be used to identify subscriber record 210-1. Baseline map records 230 may define the relationships between data records as shown in FIG. 2. Hence, baseline data structure 200 may represent a base set of data relationships.

Baseline map records 230 may include a map record type identifier representing that the baseline map records 230 are associated with and define relationships for a baseline data structure 200. Baseline map records 230 may be configured to prevent external user modification of the baseline data structure 200.

Portal subsystem 150 may be configured to provide one or more other data structures, including a customizable data structure and/or other data structure versions associated with the baseline data structure 200 of FIG. 2. FIG. 3 illustrates an exemplary customizable data structure 300 associated with baseline data structure 200. The customizable data structure 300 and/or other data structure versions of baseline data structure 200 may be formed, maintained, and utilized in any of the ways described in co-pending U.S. patent application Ser. No. 11/935,066, entitled "Data Structure Versioning for Data Management Systems and Methods" and filed Nov. 5, 2007, the content of which is herein incorporated by reference in its entirety. Portal subsystem 150 and/or data integration subsystem 120 may be configured to support horizontal and vertical data structure versioning in any of the ways described in the above-mentioned co-pending U.S. patent application Ser. No. 11/935,066 filed on Nov. 5, 2007, including using various permissions settings and/or levels (e.g., super administrator and sub-administrator) to selectively provide access to independently customizable data structures, independent versions of data structures, specific subsets of the data structures, and multiple views of data structures and subsets of the data structures.

As shown in FIG. 3, customizable data structure 300 may include copies of the subscriber record 210-1 and subscription records 220-1 and 220-2 included in the baseline data structure 200. Upon creation, the copied data records may be automatically arranged to represent an initial set of data relationships that can be modified by a user to represent a custom set of data relationships. As shown in FIG. 3, customizable data structure 300 may include copied subscriber record 210-1 having a new subscriber record 210-2 (collectively "subscriber records 210") as a child node. Subscriber record 210-2 may be created automatically as a default node (also referred to as "default folder") underneath which copies of the other data records in baseline data structure 200 may be placed. As shown, copied subscription records 220-1 and 220-2 (collectively "subscription records 220") may be child nodes of new subscriber record 210-2. The initial arrangement of the copied data records in customizable data structure 300 may be determined in any of the ways described in the previously mentioned co-pending U.S. patent application Ser. No. 11/935,066 filed on Nov. 5, 2007.

Map records used to link subscriber records 210 and subscription records 220 in customizable data structure 300 may include map record type identifiers representing a type of map record that allows for identification of the customizable data structure 300 as well as external modification of the data relationships represented in customizable data structure 300. Such map records may be referred to as "customizable map records" and are indicated with reference numbers 330 in FIG. 3.

Permissions settings may be updated so that a permissions group having permission to access and view baseline data structure 200 is also able to access, view, and modify customizable data structure 300. Accordingly, a user in the permission group may have access to both the baseline data structure 200 and the associated customizable data structure 300.

Figure 4:
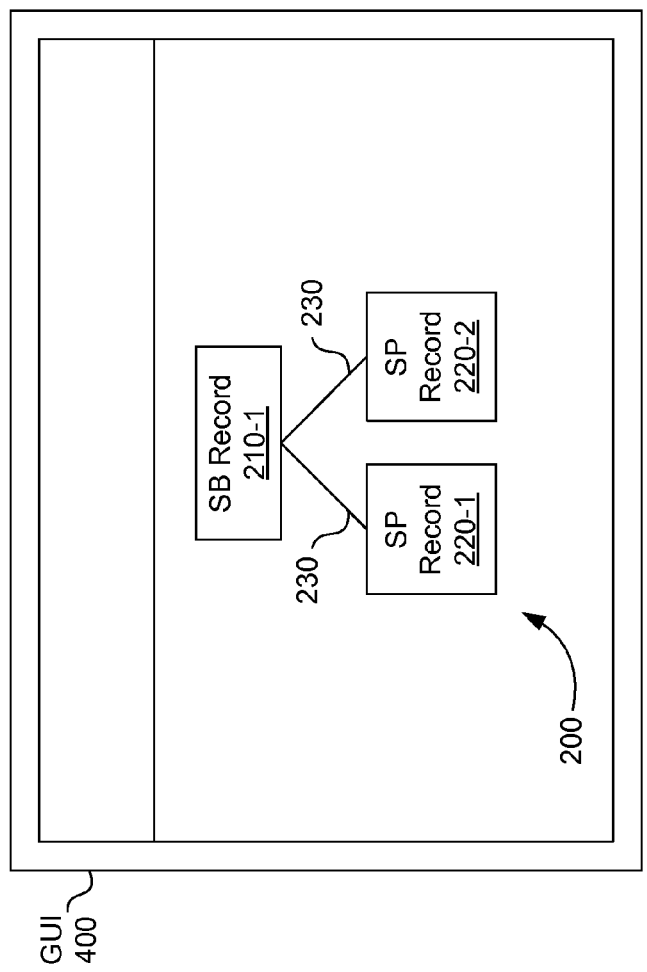
FIG. 4 illustrates an exemplary graphical user interface including a view of the baseline data structure of FIG. 2.

Portal subsystem 150 may provide data representing a view of a data structure (e.g., baseline data structure 200 or customizable data structure 300) and/or a subset of a data structure for presentation in user interface 170 (e.g., a graphical user interface). As an example, FIG. 4 illustrates a graphical user interface ("GUI") 400 with baseline data structure 200 displayed therein. GUI 400 may be displayed within user interface 170.

A user may view and utilize data displayed within GUI 400. As an example, a user viewing GUI 400 may select subscription record 220-1. The selection may be made in any suitable manner, including, but not limited to, "clicking on" or positioning a cursor over a graphical object representing subscription record 220-1. Portal subsystem 150 may recognize the selection, and initiate and provide a data access request to data integration subsystem 120. If the requested data is not found within the global data, data integration subsystem 120 may utilize a previously defined mapping from subscription record 220-1 to an associated local data record maintained by a local data subsystem 110 to identify the local data record as including the requested data. The requested local data may be retrieved, and the portal subsystem 150 may provide the requested local data to access device 160 for display in user interface 170. Accordingly, the user of access device 160 may utilize views of global data such as the view shown in FIG. 4 to retrieve associated local data maintained in local data subsystems 110.

Figure 5:
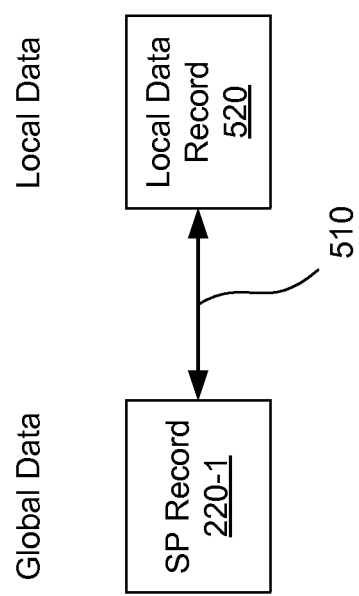
FIG. 5 illustrates an exemplary mapping between a global data record and a local data record before a data migration.

FIG. 5 illustrates an exemplary defined mapping 510 between subscription record 220-1 in the global data and a local data record 520 maintained in the local data. When a user selects subscription record 220-1 in GUI 400 as described above, mapping 510 may be used to identify the local data record 520 as being associated with the subscription record 220-1 and/or including local data associated with subscription record 220-1. Accordingly, the local data included in local data record 520 may be accessed and presented in GUI 400 in response to the user selection of subscription record 220-1. For example, subscription record 220-1 may be associated with an account, and the user may use subscription record 220-1 to request and view account invoice data included in the local data. FIG. 5 may represent a configuration before a data migration has been performed.

Local data may be migrated from one or more data schemas to a common data schema. If a data migration is treated as a typical update to the local data and the global data is synchronized with the local data as described above, a data structure or view of a data structure in the global data may be updated in the data integration subsystem 120 to reflect the change to the local data. In some cases, however, such a change may be confusing, undesirable, and/or burdensome to an external party. For instance, the external party may lose access to pre-migration data. This may be surprising, inconvenient, or even unacceptable to the external party. As an example, a local data migration may be performed to serve a particular business organization or purpose (e.g., billing operations), but other business organizations or purposes (e.g., ordering or repair operations) may not be prepared to accommodate the local data migration. As described below, system 100 may be configured to process data migrations in the local data in a manner capable of providing consistent views of global data before and after the data migrations, as well as transparent, dynamic, and selective access to pre-migration or post-migration local data.

Figure 6:
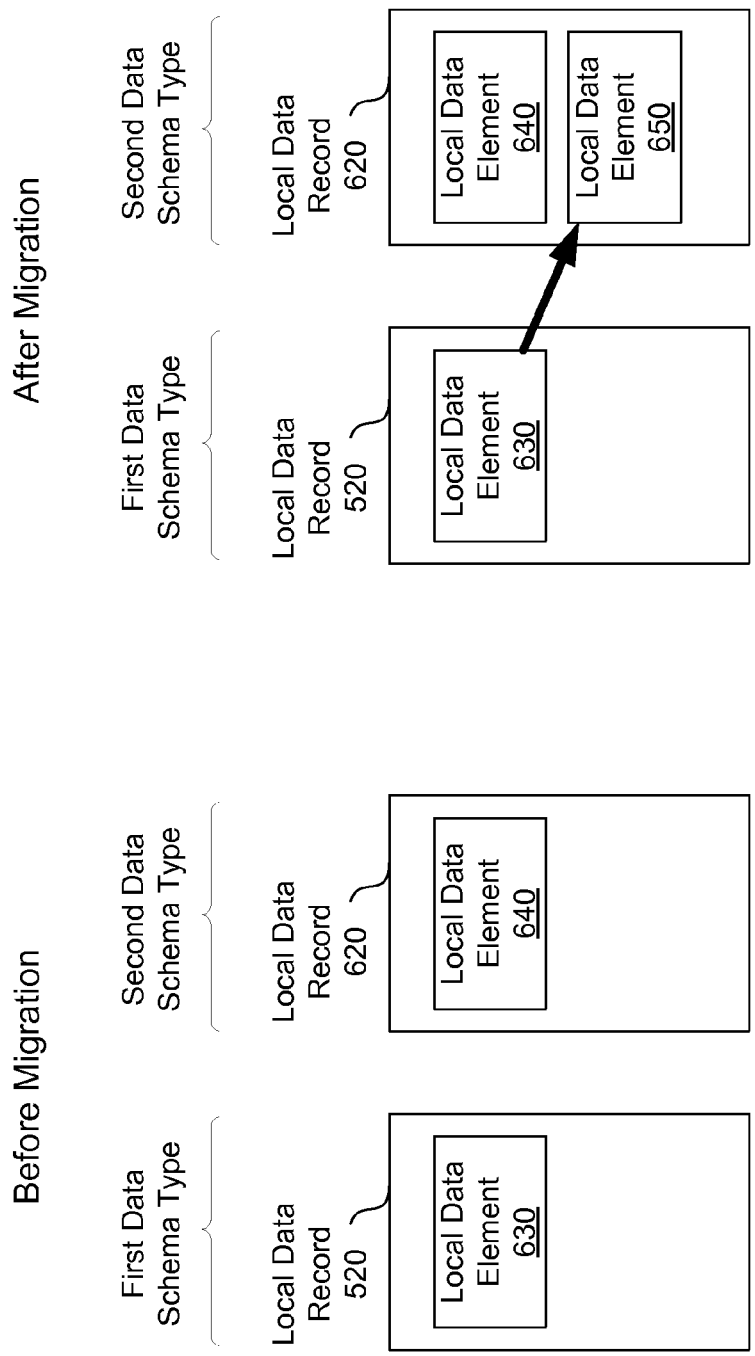
FIG. 6A illustrates exemplary local data records before a data migration.
FIG. 6B illustrates the local data records of FIG. 6A after a data migration.

As a particular example of a local data migration, FIGS. 6A-B illustrate exemplary states of local data records before and after a migration event. FIG. 6A illustrates local data record 520 maintained in accordance with a first data schema type, and another local data record 620 maintained in accordance with a second data schema type. More specifically, local data record 520 includes a local data element 630 maintained in accordance with the first data schema type, and local data record 620 includes a local data element 640 maintained in accordance with the second data schema type.

In certain cases, it may be desirable for local data element 630 to be migrated from the first data schema type to the second data schema type. For example, an internal party (e.g., an enterprise) maintaining local data subsystems 110 may desire to consolidate local data by migrating local data to a common data schema (e.g., the second data schema type). This may be desirable for a variety of reasons, including migrating data used for a particular business purpose or operation (e.g., billing) to simplify data processing.

One or more data migration operations may be performed to migrate local data element 630 from the first data schema type to the second data schema type. Data migration operations may be performed in any suitable manner, including manually, automatically, or using a combination of manual and automatic processes. Automatic data migration operations may be performed in accordance with a predefined migration heuristic, which may be defined as may suit a particular implementation, data set, data schema, and/or data migration plan.

Local data element 630 may be migrated and data representing the migrated local data element may be included in local data record 620. FIG. 6B illustrates local data records 520 and 620 after the migration event has been performed. In FIG. 6B, local data element 650 shown within local data record 620 represents the migrated local data element.

The above-described data migration example may be desirable in a variety of different situations. As an example, local data element 630 may include data related to a first service provided by an internal party to an external party, such as a Digital Subscriber Line ("DSL") service provided by a telecommunications enterprise to a subscriber. Local data element 640 may include data related to a second service provided by the internal party to the external party, such as a long distance telephone calling service provided by the telecommunications enterprise to the subscriber. For one or more reasons (e.g., a merger of business organizations), the local data elements 630 and 640 for these services may be maintained in accordance with different data schema types. Before a data migration, a business organization responsible for billing may be forced to work with both data schema types to carry out billing operations, and a user accessing global data may view separate data records for the first and second services. After a data migration, such as the one described above, the business organization may be able to work exclusively with data maintained in accordance with the second data schema type, and portal subsystem 150 may be capable of providing data for the first and second services in a single, common data record. Accordingly, billing operations and data views may be simplified.

While the data migration may be helpful to one business organization, purpose, and/or operation (e.g., billing), other business organizations, purposes, and/or operations (e.g., ordering and repairs) may continue to rely on and/or utilize local data element 630 as maintained in accordance with the first data schema type. System 100 may continue to maintain local data element 630 in accordance with the first data schema type after the data migration such that the local data element 630 may remain available for use by the other business organizations, purposes, and/or operations. As described further below, one or more smart mappings may be generated in response to one or more data migrations. A smart mapping may define a migration type mapping and may include an identifier configured to indicate that the smart mapping is of the migration type. The smart mapping may be configured to selectively map a global data record to pre-migration local data or post-migration local data. Accordingly, the smart mapping may be used to selectively map data access requests from a global data record to pre-migration local data (e.g., local data record 520) or post-migration local data (e.g., local data record 620). Accordingly, local data element 630 or local data element 650 to be selectively accessed and retrieved for use by an external party based on one or more predefined selective migration mapping conditions. Exemplary smart mappings will be described in additional detail further below.

As mentioned above, a local data migration may be carried through to and represented in the global data differently than the synchronization of global data used to update the global data to reflect other updates to the local data. As an example, when a local data migration is performed, a migration flag may be generated to indicate that a change in the local data is associated with a data migration. The migration flag, or any other suitable indicator, may be used to indicate a data migration event. The migration flag may be recognized automatically by data integration subsystem 120 and/or manually by an operator of the data integration subsystem 120. The use of a data migration flag is illustrative only. A migration event may be indicated and recognized in any suitable way and using any suitable indicator(s).

Global data may be updated to account for a recognized migration event. This may be accomplished by performing one or more manual, automatic, or a combination of manual and automatic migration update operations. In certain implementations, data integration subsystem 120 is configured to recognize a migration event and to automatically perform one or more processes described herein to update global data to account for a data migration in the local data.

In certain examples, in response to a migration event, a smart mapping (or "smart mapping record") may be generated and associated with one or more data records involved in a data migration. In the data migration example described above in which local data is migrated from local data record 520 to local data record 620, the migration event may be recognized and a smart mapping record may be generated and associated with a global data record and with the local data records 520 and 620. A global data record, e.g., subscription record 220-1, may be updated with data associating the global data record with the smart mapping record. Accordingly, data access requests associated with the global data record may be forwarded to the smart mapping record, which may selectively route the data access request to pre-migration or post-migration local data.

Figure 7:
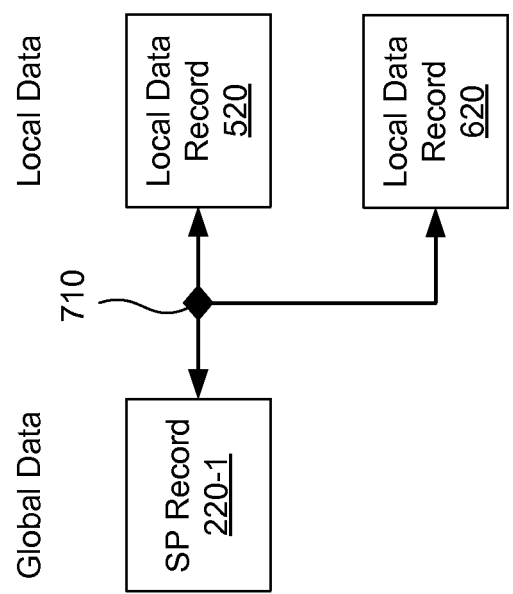
FIG. 7 illustrates an exemplary smart mapping between a global data record and two local data records after a data migration.

FIG. 7 illustrates an exemplary smart mapping record 710 associated with subscription record 220-1, local data record 520, and local data record 620. Smart mapping record 710 is configured to selectively map subscription record 220-1 to local data record 520 or local data record 620. The selective mapping may be performed dynamically (e.g., in response to a data access request associated with subscription record 220-1) and may be based on a selective mapping heuristic. When smart mapping record 710 is generated, a selective mapping heuristic may be generated and associated with the smart mapping record 710. The selective mapping heuristic may define a set of one or more conditions to be used to selectively determine a mapping destination (e.g., to local data record 520 or local data record 620). The set of conditions may include one or more criteria and may be defined to dynamically and selectively route data access requests associated with subscription record 220-1 in a way that will satisfy business purposes. Accordingly, the conditions may be defined as may suit a particular implementation, data migration plan, data schema, data set, and/or business purpose.

As an example, the above-describe exemplary data migration may be performed to consolidate local data used for billing operations to a common data schema. The relation of the data migration to billing operations may be recognized, and the selective mapping heuristic may be defined to include a set of one or more conditions configured to be used to selectively map subscription record 220-1 to local data record 620 when a data access request is associated with a billing function, and to selectively map subscription record 220-1 to local data record 520 when a data access request is associated with another function (e.g., orders, repairs, etc.).

Data integration subsystem 120 and/or portal subsystem 150 may be configured to propagate smart mapping records (e.g., smart mapping record 710) associated with data migrations from a particular data structure or view to other data structures and views maintained and provided by data integration subsystem 120 and/or portal subsystem 150. This may be accomplished in accordance with permissions settings and/or permissions groups. For example, smart mapping record 710 may be associated with subscription record 220-1 included in baseline data structure 200. Based on common permission settings for baseline data structure 200 and customizable data structure 300, smart mapping record 710 of the baseline data structure 200 may be associated with, or copied and associated with, subscription record 220-1 of customizable data structure 300. Similarly, the smart mapping record 710 may be associated with subscription record 220-1, or a copy of subscription record 220-1, included in any other data structure and/or view based on common permissions settings or other ties with baseline data structure 200.

In certain implementations, updates to global data, including propagation of smart mapping records to various global data structures, views, and data structure versions (e.g., horizontal and/or vertical data structure versions) may be performed in any of the ways described in the previously mentioned co-pending U.S. patent application Ser. No. 11/935, 066 filed on Nov. 5, 2007. Accordingly, an update adding smart mapping record 710 to baseline data structure 200 may be propagated to horizontal and vertical data structure versions of baseline data structure 200.

An example of selective mapping will now be described with reference to an instance of a user selecting subscription record 220-1 in GUI 400 and the smart mapping record 710 being used to selectively map the subscription record 220-1 to local data record 520 or local data record 620 in response to the selection of subscription record 220-1. After the above-described data migration has been performed and the global data configured accordingly, as described above, a user utilizing access device 160 may view data structure 200 in GUI 400. Portal subsystem 150 may provide this view to the user as described above. The post-migration view of data structure 200 may remain consistent with the pre-migration view shown in FIG. 4. The use of selective mapping record 710 allows the global data to account for the data migration while also being able to maintain and provide a consistent data structure view. Instead of subscription record 220-1 being replaced by another subscription record associated with migrated local data record 620, subscription record 220-1 may remain in the data structure view and be configured to selectively map data access requests from to local data record 520 or local data record 620.

The user may select subscription record 220-1 in GUI 400 in any of the ways described above. Portal subsystem 150 may detect the user selection and initiate a data access request. Initiation of the data access request may include portal subsystem 150 generating the data access request, and identifying and associating a set of one or more parameters with the data access request. As described further below, the set of parameters may be used to selectively map data access requests based on the selective mapping heuristic associated with smart mapping record 710.

The parameters may include any information potentially helpful for selective mapping. Examples of parameters include, but are not limited to, a timestamp associated with the data access request (e.g., time at which the data access request is generated), a function associated with the data access request, a user profile identifier associated with the data access request, and user permission settings. A function parameter may indicate any application, business organization, purpose or operation, or other indication of an intended use for requested data.

Portal subsystem 150 may identify the parameters in any suitable way. For example, portal subsystem 150 may identify a user profile associated with a user who selects the subscription record 220-1 and utilize any information included in the user profile, including permission settings and permitted functions associated with a user. When a user profile is created, permission settings such as those described above may be defined and may indicate one or more permitted functions associated with the user profile. For example, a user profile may indicate that a user has permission to access and perform a billing function, and another user profile may indicate that another user has permission to access and perform order and repair functions.

Figure 8:
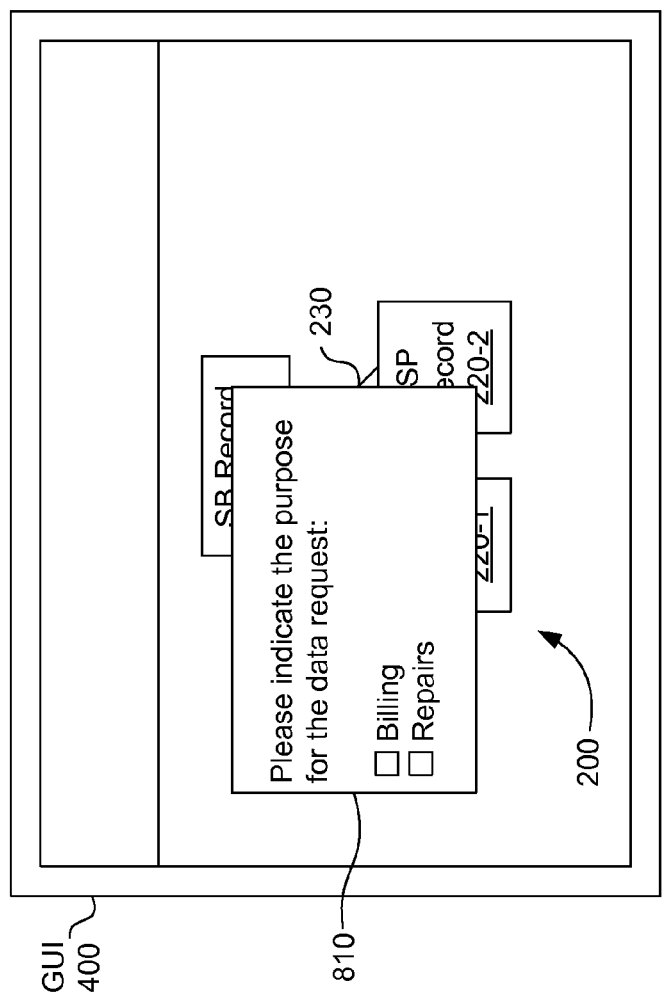
FIG. 8 illustrates an exemplary graphical user interface including a pop-up window displaying a plurality of selectable functions.

In certain examples, portal subsystem 150 may be configured to request, receive, and utilize user input to identify one or more parameters. For instance, portal subsystem 150 may prompt a user to input a function parameter to be associated with a data access request. FIG. 8 illustrates an exemplary pop-up window 810 displayed in GUI 400. When the user selects subscription record 220-1, portal subsystem 150 may generate and provide pop-up window 810 for display in GUI 400. Pop-up window 810 may be configured to prompt for user input. For example, pop-up window 810 may request user input indicative of a function to be associated with the data access request. In FIG. 8, pop-up window 810 includes a plurality of selectable options (e.g., "Billing" and "Repairs") from which the user may select one of the options. The selected option may be used to identify and associate a function parameter with the data access request.

Portal subsystem 150 may dynamically populate pop-up window 810 with one or more selectable options. For example, a user profile associated with the data access request may indicate that certain permitted functions such as "Billing" and "Repairs" are associated with the user profile. Accordingly, portal subsystem 150 may include the user profile functions as selectable options in the pop-up window 810 and enable the user to select one of the options to indicate a function to be associated with the data access request.

While pop-up window 810 includes selectable functions in FIG. 8, this example is illustrative only. Pop-up window 810 may prompt a user for any suitable information. In certain implementations, for example, pop-up window 810 may prompt a user for time data, such as a date or range of dates for invoice data.

After one or more parameters are identified and associated with a data access request, portal subsystem 150 may provide the data access request and associated parameters to data integration subsystem 120. Data integration subsystem 120 may utilize smart mapping record 710 to selectively map subscription record 220-1 to local data record 520 or local data record 620 based on one or more of the parameters associated with the data access request. Based on the determined selective mapping, data integration subsystem 120 may selectively route the data access request to local data record 520 or local data record 620. For example, the selective mapping heuristic associated with smart mapping record 710 may be defined to map a data access request from subscription record 220-1 to local data record 620 when the function parameter associated with the data access request is "Billing" and to map the data access request from subscription record 220-1 to local data record 520 when the function parameter associated with the data access request is something other than "Billing" (e.g., "Repairs"). Accordingly, data requests associated with a first function (e.g., a "Billing" function) may be selectively routed to post-migration local data, and data requests associated with another function may be selectively routed to pre-migration local data. This may allow local data to be migrated and used for certain business purposes while also keeping pre-migrated data available for continued use for other business purposes.

After the selective mapping has been determined and the data access request routed accordingly, data integration subsystem 120 may retrieve and provide a copy of the identified local data to portal subsystem 150, which may provide the local data to access device 160 for presentation to a user. For example, the local data may be displayed in user interface 170. In this manner, a user may request data, and system 100 may selectively identify and provide pre-migration or post-migration data to the user based on predefined selective mapping conditions and one or more parameters associated with the data access request.

Permission settings for various users (e.g., super-administrators and/or sub-administrators) associated with an external party may be updated to account for and provide access to data associated with a data migration. For the exemplary data migration illustrated in FIG. 4, for example, user permissions for users having access to local data record 520 may be updated to grant access to local data record 620. In other examples, permission settings for a super-administrator may be automatically updated to grant the super-user with access to migrated data, and permission settings for sub-administrators may be updated as allowed or instructed by the super-administrator. In some examples, portal subsystem 150 may be configured to provide a notification when a user requests to access migrated data that the user is not permitted to access. For instance, a sub-administrator may select subscriber record 220-1, and smart mapping record 710 may selectively map the subscriber record 220-1 to local data record 620. If the sub-administrator does not have permission to access local data record 620, portal subsystem 150 may notify the sub-administrator to contact an appropriate super-administrator to seek permission to access local data record 620. In certain examples, portal subsystem 150 may be configured to notify the super-administrator of the request to access unpermitted data. Accordingly, the super-administrator may control permissions to migrated data.

The use of functions as conditions for selectively routing data access requests is just one example of conditions that may be used to selectively route the data access requests to pre-migration or post-migration local data. As another example, time data may be used as a condition for selective routing of data access requests. For instance, when a local data migration is performed and smart mapping record 710 is generated as described above, the selective mapping heuristic associated with the smart mapping record 710 may be defined to include a time-based condition. In some examples, a certain time may be defined and used to dictate when a data migration will be made effective in the data integration subsystem 120. This may allow an internal party to define a future effective migration time. Before the set time, data migrations may be performed within local data subsystems 110, smart mapping records associated with the data migrations may be generated and implemented as described above, and the data migrations and smart mapping records may be tested before the data migrations become effective in the global data at the set time.

When a data access request is initiated, a timestamp may be associated with the data access request as described above. The timestamp may be compared with a time-based condition included in the selective mapping heuristic associated with a smart mapping record. Based on the results of the comparison, the data access request is selectively routed. For example, if a timestamp for a data access request is earlier in time than a time and/or date condition of smart mapping record 710, the data access request may be routed to local data record 520. Accordingly, data access requests that are initiated earlier in time than the defined effective date of a data migration may be routed by default to pre-migration local data. If a timestamp for a data access request is equal to or later in time than a time-based condition of smart mapping record 710, the data access request may be routed to local data record 620. Accordingly, data access requests that are initiated later in time than the defined effective date of a data migration may be by default routed to post-migration local data.

Data integration subsystem 120 and/or portal subsystem 150 may be configured to provide one or more tools enabling a user to override a time-based default routing of data access requests. For example, portal subsystem 150 may be configured to provide a graphical user interface and/or other tool that the user may utilize to manually provide time data to be used for selective routing of a data access request. For instance, a user may provide a date or a range of dates to be used to locate local data (e.g., subscriber invoices for certain dates).

As another example, a data access request may be routed by time-based default to local data record 620, which may be accessed, retrieved, and provided to access device 160 for presentation to a user as described above. The local data record 620 may include a selectable link to local data record 520. This link may be inserted in local data record 620 when the data migration illustrated in FIG. 4 is performed. The user may select the link to initiate a request for local data record 520. In response to the request, portal subsystem 150 and/or data integration subsystem 120 may identify, retrieve, and provide local data record 520 to access device 160 for presentation to the user. Accordingly, a user may continue to gain access to pre-migration local data by way of post-migration data after a data migration has been made effective.

Time-based mapping conditions may be used as an alternative or in addition to function-based mapping conditions. Alternatively or additionally, other conditions may be used for selective mapping and routing of data access requests.

The above-described examples of data migration and selective mapping are illustrative only. System 100 may support other data migrations and selective mappings based on the principles described herein. For example, the above-described data migration includes a migration of local data from local data record 520 to another preexisting local data record 620. In other examples, a data migration may include creating at least one new local data record to which local data is migrated.

Figure 9:
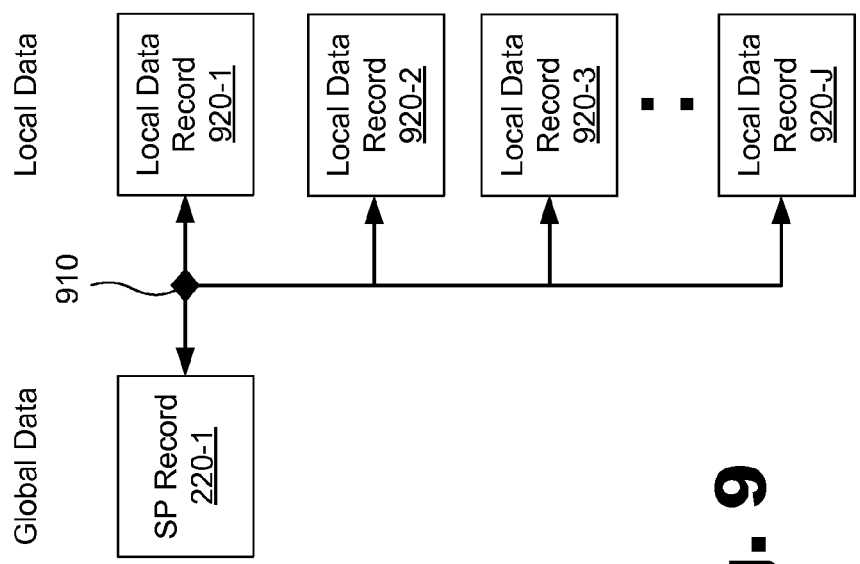
FIG. 9 illustrates an exemplary smart mapping between a global data record and a plurality of local data records after a data migration.

As another example, while FIG. 7 illustrates smart mapping record 710 configured to selectively map subscription record 220-1 to one of two local data records 520 and 620, other smart mapping records may be configured to selectively map from a global data record to any of a number of local data records. FIG. 9 illustrates a smart mapping record 910 configured to selectively map subscription record 220-1 to one of a plurality of local data records 920-1 through 920-J. Such a configuration may be employed when local data is migrated from one local data record 920-1 to a plurality of other local data records 920-2 through 920-J.

Figure 10:
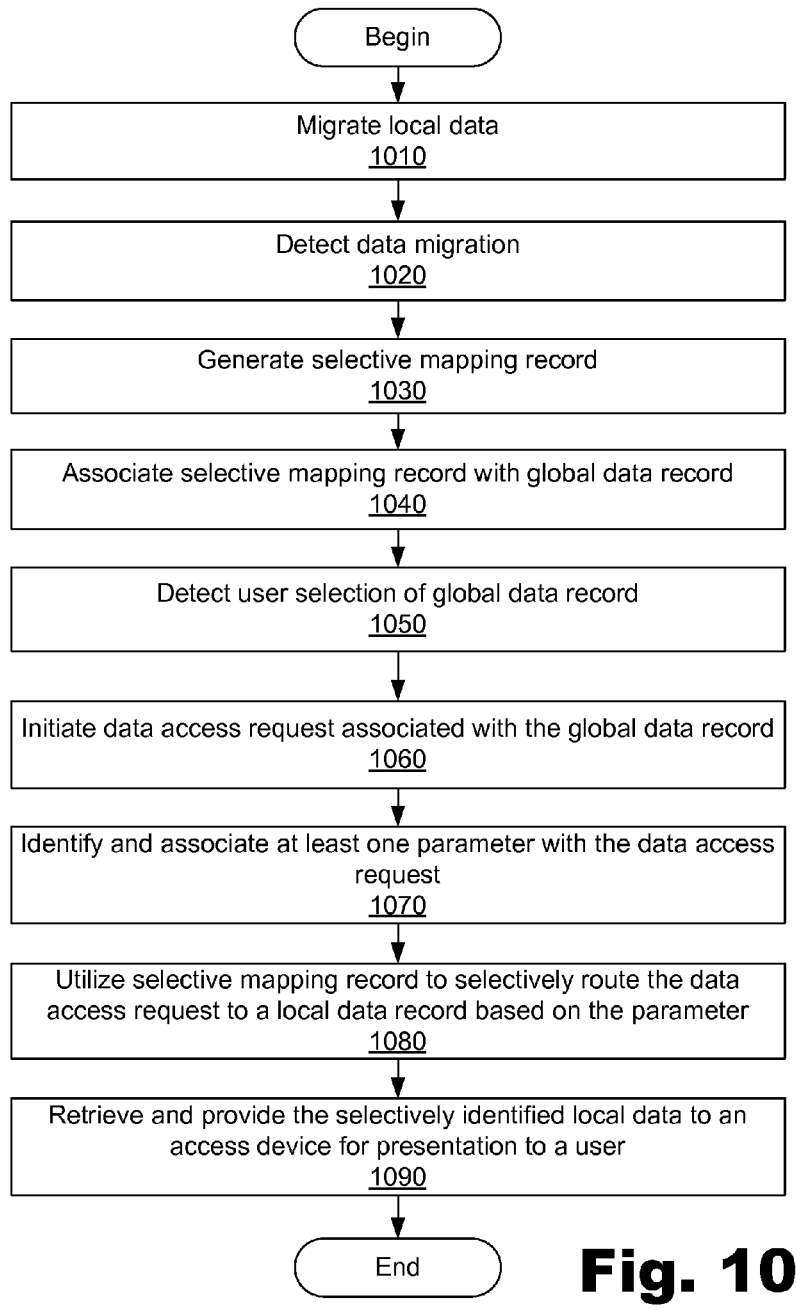
FIG. 10 illustrates an exemplary data migration mapping method.

FIG. 10 illustrates an exemplary data migration and selective data mapping method. While FIG. 10 illustrates exemplary steps according to one implementation, other implementations may omit, add to, reorder, and/or modify any of the steps shown in FIG. 10.

In step 1010, local data is migrated. Step 1010 may be performed in any of the ways described above, including migrating local data from one local data record 520 to another local data record 620 in local data subsystems 110.

In step 1020, the data migration is detected. Step 1020 may be performed in any of the ways described above, including data integration subsystem 120 detecting a migration flag that has been generated as part of a data migration.

In step 1030, a selective mapping record is generated. Step 1030 may be performed in any of the ways described above, including data integration subsystem 120 generating the selective mapping record (e.g., selective mapping record 710), a selective mapping heuristic having at least one mapping condition, and associating the selective mapping heuristic with the selective mapping record.

In step 1040, the selective mapping record is associated with a global data record. Step 1040 may be performed in any of the ways described above, including associating selective mapping record 710 with subscription record 220-1. As described above, the selective mapping record is configured to selectively map the global data record to pre-migration or post-migration local data.

In step 1050, a user selection of the global data record is detected. Step 1050 may be performed in any of the ways described above, including portal subsystem 150 providing a view including the global data record and detecting a user selection of the global data record included in the view.

In step 1060, a data access request associated with the global data record is initiated. Step 1060 may be performed in any of the ways described above, including portal subsystem 150 generating the data access request in response to the user selection of the global data record.

In step 1070, at least one parameter is identified and associated with the data access request. Step 1070 may be performed in any of the ways described above, including portal subsystem 150 determining the parameter and/or requesting and receiving user input defining the parameter.

In step 1080, the global data record is selectively mapped based on the parameter. Step 1080 may be performed in any of the ways described above, including using the smart mapping record to selectively map the global data record to pre-migration or post-migration local data based on the parameter. Accordingly, the data access request is routed based on the selected mapping to the pre-migration or post-migration local data.

In step 1090, the selectively identified local data is retrieved and provided to an access device 160 for presentation to a user. Step 1090 may be performed in any of the ways described above, including data integration subsystem 120 and/or portal subsystem 150 retrieving the identified local data from local data subsystems 110 and providing the retrieved data to the access device 160 for display.

In the preceding description, various exemplary implementations have been described with reference to the accompanying drawings. It will, however, be evident that various modifications and changes may be made thereto, and additional implementations may be provided, without departing from the scope of the invention as set forth in the claims that follow. For example, certain features of one implementation described herein may be combined with or substituted for features of another implementation described herein. The description and drawings are accordingly to be regarded in an illustrative rather than a restrictive sense.

What is claimed is:

1. A method comprising:

maintaining, by a data integration subsystem including at least one computing device, global data and a defined mapping of the global data to local data maintained by a plurality of local data subsystems communicatively coupled to the data integration subsystem, the global data including a global data record mapped to a first local data record that is included in the local data and defined in accordance with a first data format;

recognizing, by the data integration subsystem, a data migration event in the local data, the data migration event including a migration of a data element included in the first local data record defined in accordance with the first data format to a second local data record that is included in the local data and defined in accordance with a second data format, wherein after the data migration event the first local data record includes the data element defined in accordance with the first data format and the second local data record includes the migrated data element defined in accordance with the second data format; and associating, by the data integration subsystem in response to the recognizing of the data migration event in the local data, a smart mapping record with the global data record, the smart mapping record configured to selectively map the global data record to one of the first local data record and the second local data record.

2. The method of claim 1, further comprising:

maintaining, by the data integration subsystem, a data structure representative of a set of data relationships in the global data, the data structure including the global data record; and providing, by a portal subsystem communicatively coupled to the data integration subsystem, a consistent view of at least a portion of the data structure for display to an external party before and after the data migration event.

3. The method of claim 1, further comprising:

detecting, by a portal subsystem communicatively coupled to the data integration subsystem, a data access request associated with the global data record;

determining, by the portal subsystem, a parameter associated with the data access request; and selectively mapping, by the data integration subsystem, the global data record to one of the first local data record and the second local data record based on the parameter.

4. The method of claim 3, further comprising:
- providing, by the portal subsystem in response to the data access request, data included in the first local data record for display when the parameter comprises a first function; and
- providing, by the portal subsystem in response to the data access request, data included in the second local data record for display when the parameter comprises a second function.

5. The method of claim 3, wherein determining the parameter comprises providing a graphical user interface for display, the graphical user interface requesting user input indicative of a function associated with the data access request.

6. The method of claim 5, further comprising:
- identifying, by the portal subsystem, a plurality of functions associated with a user profile; and
- populating, by the portal subsystem, the graphical user interface with the plurality of functions, each of the functions being selectable by a user.

7. The method of claim 1, further comprising:
- generating, by the data integration subsystem, the smart mapping record;
- defining, by the data integration subsystem, a selective mapping heuristic to include at least one condition for selectively routing a data access request from the global data record to one of the first local data record and the second local data record; and
- associating, by the data integration subsystem, the selective mapping heuristic with the smart mapping record.

8. The method of claim 7, wherein the at least one condition comprises at least one of a function-based condition and a time-based condition.

9. The method of claim 7, wherein the at least one condition comprises a predefined effective migration time, the method further comprising:
- providing, by a portal subsystem communicatively coupled to the data integration subsystem in response to the data access request, data included in the first local data record for display when the parameter comprises a timestamp that is earlier in time than the predefined effective migration time; and
- providing, by a portal subsystem communicatively coupled to the data integration subsystem in response to the data access request, data included in the second local data record for display when the parameter comprises a timestamp that is equal to or later in time than the predefined effective migration time.

10. The method of claim 1, wherein the data migration event further includes a migration of the data element included in the first local data record to another local data record that is included in the local data and defined in accordance with the second data format, and wherein the smart mapping record is configured to selectively map the global data record to one of the first local data record, the second local data record, and the another local data record.

11. The method of claim 1, further comprising updating user permission settings to provide at least one user associated with an external party with access to the second local data record.

12. The method of claim 1, further comprising:
- maintaining, by the data integration subsystem, a plurality of data structures representative of a plurality of data relationships in the global data, the plurality of data structures including a first data structure version including the global data record and a second data structure version including the global data record; and
- propagating, by the data integration subsystem, the smart mapping record from the first data structure version including the global data record to the second data structure version including the global data record.

13. The method of claim 1, tangibly embodied as computer-executable instructions on at least one non-transitory computer-readable medium.

14. A method comprising:
- maintaining, by a data integration subsystem including at least one computing device, global data and a defined mapping of the global data to local data maintained by a plurality of local data subsystems communicatively coupled to the data integration subsystem, the global data including a global data record mapped to a first local data record that is included in the local data and defined in accordance with a first data format;
- recognizing, by the data integration subsystem, a data migration event in the local data, the data migration event including a migration of a data element included in the first local data record defined in accordance with the first data format to a second local data record that is included in the local data and defined in accordance with a second data format, wherein after the data migration event the first local data record includes the data element defined in accordance with the first data format and the second local data record includes the migrated data element defined in accordance with the second data format;
- associating, by the data integration subsystem in response to the recognizing of the data migration event in the local data, a smart mapping record with the global data record, the smart mapping record configured to selectively map the global data record to one of the first local data record and the second local data record;
- receiving, by the data integration subsystem, a first access request associated with the global data record, the first access request being associated with a first function;
- mapping, by the data integration subsystem in response to the first access request, the global data record to the first local data record based on the first function and the smart mapping record;
- receiving, by the data integration subsystem, a second access request associated with the global data record, the second access request being associated with a second function; and
- mapping, by the data integration subsystem in response to the second access request, the global data record to the second local data record based on the second function and the smart mapping record.

15. The method of claim 14, further comprising:
- maintaining, by the data integration subsystem, a data structure representative of a set of data relationships in the global data, the data structure including the global data record; and
- providing, by a portal subsystem communicatively coupled to the data integration subsystem, a consistent view of at least a portion of the data structure for display to an external party before and after the data migration event.

16. The method of claim 14, further comprising:
- providing, by a portal subsystem communicatively coupled to the data integration subsystem in response to the second access request, data included in the second local data record for display, wherein the data included in the second local data record includes a link to data included in the first local data record;
- detecting, by the portal subsystem, a user selection of the link; and retrieving and providing, by the portal subsystem in response to the user selection of the link, the data included in the first local data record for display.

17. The method of claim 14, wherein the first function is associated with a first business operation and the second function is associated with a second business operation.

18. A system comprising:
at least one computing device implementing:
a plurality of data subsystems configured to store local data associated with an external party, the plurality of data subsystems further configured to be maintained by an internal party; and
a data integration subsystem communicatively coupled to the plurality of data subsystems and configured to
store global data and a defined mapping of the global data to the local data, the global data including a global data record mapped to a first local data record that is included in the local data and defined in accordance with a first data format,
recognize a data migration event in the local data, the data migration event including a migration of a data element included in the first local data record defined in accordance with the first data format to a second local data record that is included in the local data and defined in accordance with a second data format, wherein after the data migration event the first local data record includes the data element defined in accordance with the first data format and the second local data record includes the migrated data element defined in accordance with the second data format, and
associate, in response to the recognizing of the data migration event in the local data, a smart mapping record with the global data record, the smart mapping record configured to selectively map the global data record to one of the first local data record and the second local data record.

19. The system of claim 18, wherein the data integration subsystem is configured to maintain a data structure representative of a set of data relationships in the global data, the data structure including the global data record; and
wherein the system further comprises a portal subsystem communicatively coupled to the data integration subsystem and configured to provide a consistent view of at least a portion of the data structure for display to the external party before and after the data migration event.

20. The system of claim 18, wherein the system comprises a portal subsystem communicatively coupled to the data integration subsystem, the portal subsystem configured to
detect a user selection of the global data record,
initiate a data access request associated with the global data record,
determine at least one parameter associated with the data access request, and
provide the data access request and the at least one parameter to the data integration subsystem; and
wherein the data integration subsystem is configured to
receive the data access request and the at least one parameter, and
selectively route the data access request from the global data record to one of the first local data record and the second local data record based on the at least one parameter.

21. The system of claim 20, wherein the at least one parameter comprises at least one of a function, a timestamp, and a user profile identifier associated with the data access request.

22. The system of claim 20, wherein the data integration subsystem is configured to
retrieve, in response to the data access request, data included in the first local data record for display when the parameter comprises a first function, and
retrieve, in response to the data access request, data included in the second local data record for display when the parameter comprises a second function; and
wherein the portal subsystem is configured to provide the retrieved data to an access device for display.

* * * * *